(12) United States Patent
Sitabkhan et al.

(10) Patent No.: US 8,443,650 B2
(45) Date of Patent: May 21, 2013

(54) TEMPERATURE COMPENSATED PRESSURE SWITCH (TCPS)

(75) Inventors: Abdul N. Sitabkhan, Arcadia, CA (US); Michael A. Mallari, Alta Loma, CA (US)

(73) Assignee: Mass Systems, A Unit of Ameron Global, Inc., Baldwin Park, CA (US)

( * ) Notice: Subject to any disclaimer, the term of this patent is extended or adjusted under 35 U.S.C. 154(b) by 1564 days.

(21) Appl. No.: 11/948,842

(22) Filed: Nov. 30, 2007

(65) Prior Publication Data

US 2008/0127725 A1 Jun. 5, 2008

Related U.S. Application Data

(60) Provisional application No. 60/868,056, filed on Nov. 30, 2006.

(51) Int. Cl.
*G01F 25/00* (2006.01)

(52) U.S. Cl.
USPC ............................................................ 73/1.73

(58) Field of Classification Search
USPC .................................. 73/290 B, 1.73; 702/55
See application file for complete search history.

(56) References Cited

U.S. PATENT DOCUMENTS

| | | | | |
|---|---|---|---|---|
| 3,129,309 A | * | 4/1964 | McKeough et al. | 218/68 |
| 3,487,348 A | * | 12/1969 | Linsalato | 337/320 |
| 4,599,892 A | * | 7/1986 | Doshi | 73/49.2 |
| 4,602,344 A | * | 7/1986 | Ferretti et al. | 702/55 |
| 4,736,329 A | * | 4/1988 | Ferretti et al. | 700/281 |
| 4,788,648 A | * | 11/1988 | Ferretti et al. | 702/55 |
| 5,138,559 A | * | 8/1992 | Kuehl et al. | 702/55 |
| 5,304,758 A | * | 4/1994 | Bishop et al. | 200/83 J |
| 5,379,637 A | * | 1/1995 | Abowd et al. | 73/290 R |
| 5,578,993 A | * | 11/1996 | Sitabkhan et al. | 340/614 |
| 6,892,572 B2 | * | 5/2005 | Breed et al. | 73/290 R |
| 6,932,028 B1 | * | 8/2005 | Hatfield et al. | 122/508 |
| 7,342,531 B2 | * | 3/2008 | Hagg et al. | 342/124 |
| 7,765,867 B2 | * | 8/2010 | Schaffer et al. | 73/292 |

* cited by examiner

*Primary Examiner* — John Fitzgerald (57) ABSTRACT

A temperature compensated pressure switch ("TCPS") with thermal lag compensation, trend indication, and forecast analysis. The TCPS has a first control unit, a pressure sensor connected to the first control unit outputting a first pressure data, a temperature sensor connected to the first control unit outputting a first temperature data, and a first storage unit connected to the first control unit storing: minimum and maximum pressure data corresponding to temperature data and rate of temperature change values. The first control unit can substitute a second temperature data, for the first temperature data for a period of time. The first control unit also outputs a first signal indicating the amount of material is acceptable when the first pressure data is above the minimum pressure data and outputs a second signal indicating the amount of material is unacceptable when the first pressure data is not above the minimum pressure data.

25 Claims, 8 Drawing Sheets

| LOCATION | ADDRESS | BYTE | RAW TEMP | °C | °F | PRESSURE |
|---|---|---|---|---|---|---|
| 0 | 000 | 03 | 0 | -55 | -67.0 | 948 |
| 1 | 001 | B4 | | | | |
| 2 | 002 | 03 | 1 | -54 | -65.2 | 958 |
| 3 | 003 | BE | | | | |
| 4 | 004 | 03 | 2 | -53 | -63.4 | 964 |
| 5 | 005 | C3 | | | | |
| 6 | 006 | 03 | 3 | -52 | -61.6 | 969 |
| 7 | 007 | C9 | | | | |
| 8 | 008 | 03 | 4 | -51 | -59.8 | 975 |
| 9 | 009 | CE | | | | |
| 10 | 00A | 03 | 5 | -50 | -58.0 | 982 |

...

| LOCATION | ADDRESS | BYTE | RAW TEMP | °C | °F | PRESSURE |
|---|---|---|---|---|---|---|
| 260 | 104 | 0F | 130 | 75 | 167.0 | 3,990 |
| 261 | 105 | 96 | | | | |
| 262 | 106 | 0F | 131 | 76 | 168.8 | 4,023 |
| 263 | 107 | B7 | | | | |
| 264 | 108 | 0F | 132 | 77 | 170.6 | 4,056 |
| 265 | 109 | D8 | | | | |
| 266 | 10A | 0F | 133 | 78 | 172.4 | 4,089 |
| 267 | 10B | F9 | | | | |
| 268 | 10C | 10 | 134 | 79 | 174.2 | 4,122 |
| 269 | 10D | 1A | | | | |
| 270 | 10E | 10 | 135 | 80 | 176.0 | 4,155 |

...

| LOCATION | ADDRESS | BYTE | RAW TEMP | °C | °F | PRESSURE |
|---|---|---|---|---|---|---|
| 350 | 15E | 15 | 175 | 120 | 248.0 | 5,475 |
| 351 | 15F | 63 | | | | |
| 352 | 160 | 15 | 176 | 121 | 249.8 | 5,508 |
| 353 | 161 | 84 | | | | |
| 354 | 162 | 15 | 177 | 122 | 251.6 | 5,541 |
| 355 | 163 | A5 | | | | |
| 356 | 164 | 15 | 178 | 123 | 253.4 | 5,574 |
| 357 | 165 | C6 | | | | |
| 358 | 166 | 15 | 179 | 124 | 255.2 | 5,607 |
| 359 | 167 | E7 | | | | |

TEMPERATURE COMPENSATED PRESSURE SWITCH (TCPS)

RELATED APPLICATIONS

The present application claims priority pursuant to 35 U.S.C. §119(e) for provisional application 60/868,056, filed Nov. 30, 2006.

BACKGROUND OF THE INVENTION

1. Field of the Invention

The present invention relates to temperature compensated pressure switch with thermal lag compensation, trend indication, and forecast analysis.

2. Description of Related Art

Figure 1:
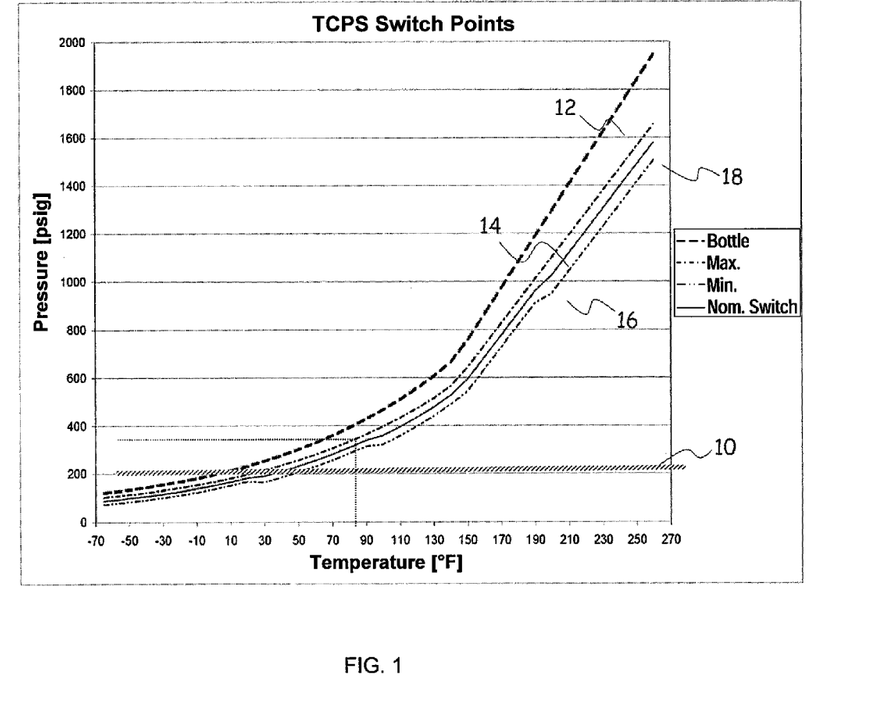
FIG. 1 is a pressure versus temperature chart.

As seen in FIG. 1, the prior art determines whether there is a sufficient amount of material in a vessel by setting a pressure threshold 10. If the pressure 12 of the vessel is above pressure threshold 10, then it is deemed that the amount of material in the vessel is sufficient and if pressure 12 of the vessel is below pressure threshold 10, then it is deemed that the amount of material in the vessel is insufficient. However, as can be seen, the pressure of the vessel is correlated with the temperature of the vessel and can greatly fluctuate with temperature increase and decreases. Thus, at 70° F. the pressure data would indicate that there is sufficient amount of material in the vessel as the pressure data would be above pressure threshold 10.

However, if the temperature is increased to 200° F. it would take a significant loss of material within the vessel to reduce the pressure data below pressure threshold 10. Thus, there would be a false indication that the pressure was acceptable. Furthermore, if the temperature was decreased from 70° F. to −30° F., and the amount of material in the vessel remained constant, the pressure data would be below pressure threshold 10. Thus, there would be false indication that the pressure was unacceptable.

Furthermore, systems which utilize a pressure sensor and a temperature sensor may still be susceptible to thermal lag conditions where the ambient temperature increases or decreases rapidly. During thermal lag conditions, the temperature sensor may inaccurately indicate that the material within the vessel has a high rate of temperature change value. However, in actuality, the material within the vessel can actually have a rate of temperature change value lower than the inaccurate high rate of temperature change value.

This can be problematic since the determination of whether there is an acceptable amount of material within the vessel is dependent on whether the pressure detected by the pressure sensor is above a minimum pressure corresponding to the detected temperature data. However, with an incorrect temperature data, there is an incorrect minimum pressure data. Thus, the system can falsely indicate that there is an unacceptable amount of material within the vessel.

SUMMARY OF THE INVENTION

In one embodiment the present invention is a temperature compensated pressure switch ("TCPS") for determining and analyzing an amount of material within a vessel. The TCPS includes a first control unit, a pressure sensor connected to the first control unit outputting a first pressure data, a temperature sensor connected to the first control unit outputting a first temperature data, and a first storage unit connected to the first control unit storing: (1) minimum pressure data corresponding to temperature data, (2) the first temperature data at periodic intervals, (3) maximum rate of temperature change values, (4) first substitute rate of temperature change values corresponding to maximum rate of temperature change values, (5) minimum rates of temperature change values, and (6) second substitute rate of temperature change values corresponding to minimum rates of temperature change values.

When the first control unit determines, based on the first temperature data stored in the first storage unit, that a rate of temperature change value is above a maximum rate of temperature change value, the first control unit substitutes a second temperature data, based on a first substitute rate of temperature change value, for the first temperature data for a period of time.

When the first control unit determines, based on the first temperature data stored in the first storage unit, that a rate of temperature change value is below a minimum rate of temperature change value, the first control unit substitutes a second temperature data, based on a second substitute rate of temperature change value, for the first temperature data for a period of time.

The first control unit outputs a first signal indicating the amount of material is acceptable when the first pressure data is above the minimum pressure data and outputs a second signal indicating the amount of material is unacceptable when the first pressure data is not above the minimum pressure data.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings:

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

As seen in FIG. 1, the present invention uses minimum pressure data 16 and maximum pressure data 14 as pressure thresholds. Thus, if pressure data 18 is between minimum pressure data 16 and maximum pressure data 14, there is sufficient amount of material in the vessel. If, however, pressure data 18 is above maximum pressure data 14, then there is too much material in the vessel. Likewise, if pressure data 18 is below minimum pressure data 16, then there is too little material in the vessel. Thus, the likelihood of incorrect readings of the amount of material is reduced. Furthermore, the present invention can also compensate for thermal lag conditions.

Figure 2:
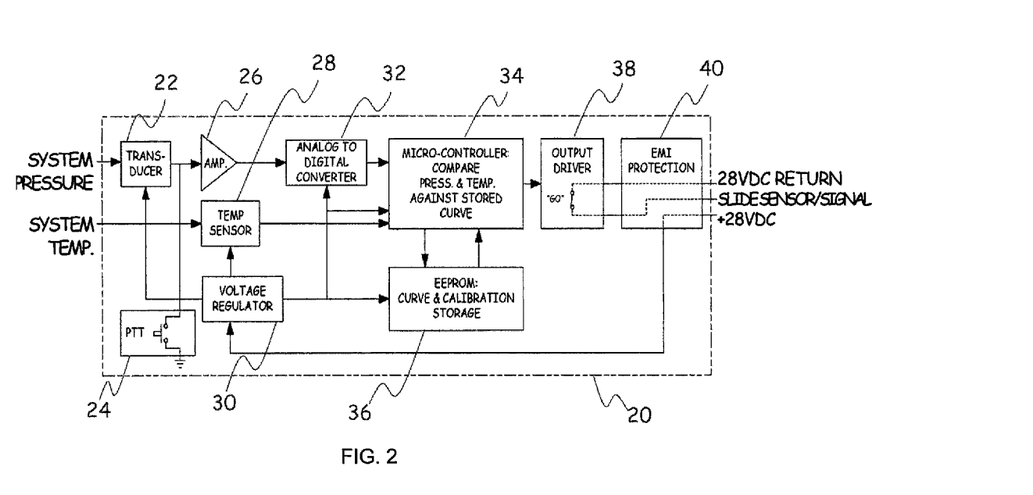
FIG. 2 is a block diagram of an embodiment the present invention.

As seen in FIG. 2, in one embodiment of the present invention, electronic components 20 of a temperature compensated pressure switch ("TCPS") comprises a pressure sensor 22, an amplifier 26, a test module 24, a temperature sensor 28, a voltage regulator 30, an analog to digital converter 32, a control unit 34, a storage unit 36, an output driver 38, and an electro-magnetic interference protection unit 40.

In the TCPS, both pressure sensor 22 and temperature sensor 28 are connected to voltage regulator 30. Pressure sensor 22 is connected to amplifier 26 which is connected to analog to digital converter 32. Both analog to digital converter 32 and temperature sensor 32 are connected to control unit 34. Control unit 34 is also connected to storage unit 36 and output driver 38. Output driver 38 is connected to electro-magnetic interference protection unit which is connected to voltage regulator 30. The present invention also has test module 24 which is connected between pressure sensor 22 and amplifier 26.

In operation pressure sensor 22 detects the pressure of the vessel and outputs an analog signal containing the corresponding pressure data to amplifier 26. Amplifier 26 amplifies the analog signal containing the pressure data and relays it to analog to digital converter 32. Analog to digital converter 32 converts the analog signal to a digital signal and outputs the digital signal containing the pressure data to control unit 34. In the present invention pressure sensor 22 is a transducer, however, it is contemplated that pressure sensor 22 could be a variety of pressure sensors and is not limited to just a transducer.

Temperature sensor 28 detects the temperature of the vessel and outputs the temperature data corresponding to the temperature of the vessel to control unit 34. Although temperature sensor 28 in the present invention is a digital temperature sensor, temperature sensor 28 could be an analog temperature sensor.

First control unit 34 receives the pressure data and the temperature data outputted from pressure sensor 22 and temperature sensor 28, respectively. Control unit 34 utilizes the temperature data to determine the minimum pressure data from a look-up table in storage unit 36 shown in FIG. 8. Control unit 34 compares the pressure data with the minimum pressure data and when the pressure data is above the minimum pressure data, control unit 34 outputs a first signal to output driver 38 indicating the amount of material is acceptable.

Storage unit 36 can also store maximum pressure data and control unit 34 can compare the pressure data with the maximum pressure data. If the pressure data is below the maximum pressure data, control unit 34 outputs a second signal to output driver 38 indicating the amount of material is unacceptable.

Figure 8:
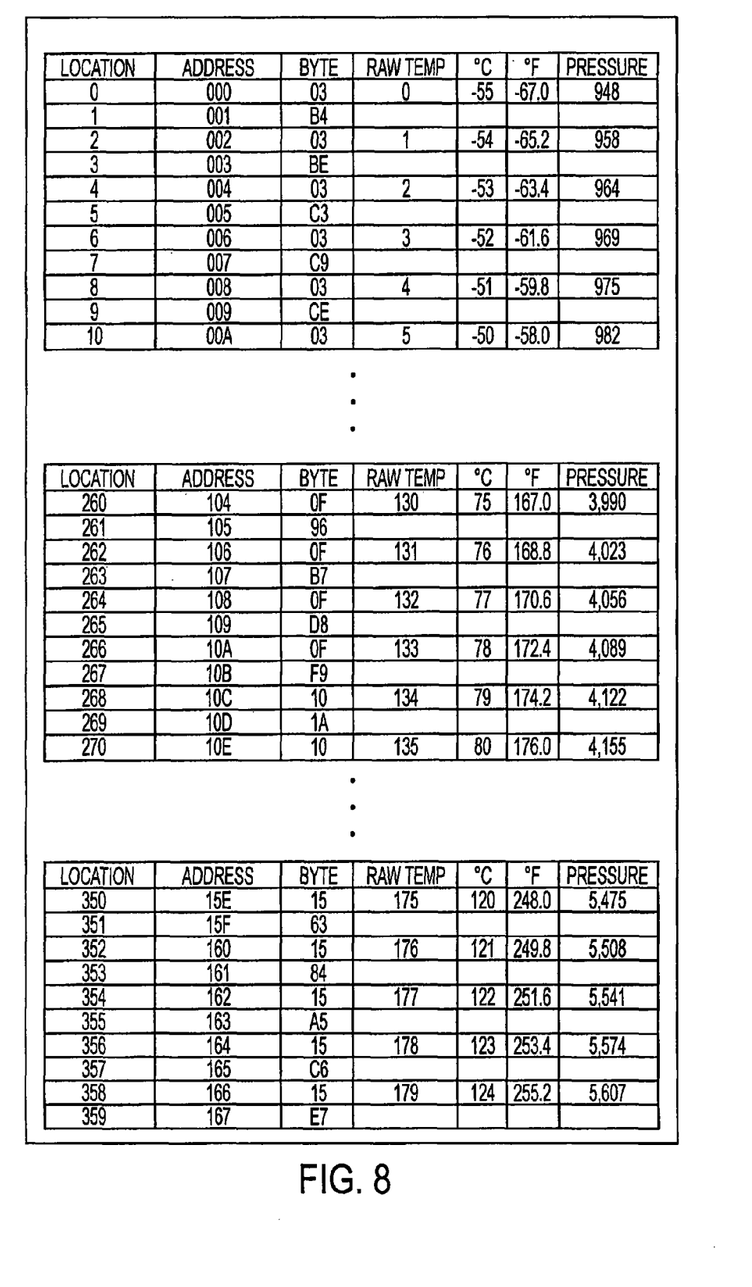
FIG. 8 is a look-up table for minimum pressure.

Referring to FIG. 8, the look-up table in storage unit 36 can include seven categories of data including location, address, byte, raw temperature, ° C., ° F., and pressure. The pressure indicates the minimum pressure data in pounds-per-square-inch-gauge (psig). The location, address, and byte are used to indicate the location of the raw temperature, ° C., ° F., and minimum pressure data within storage unit 36 for retrieval. Thus, in location 0 & 1, address 000 & 001, and byte 03 & B4, corresponding to raw temperature 0, the temperature is −55° C., and/or the temperature is −67° F., the minimum pressure data is 948 psig. Furthermore, in location 262 & 263, address 106 & 107, byte 0F & B7, corresponding to raw temperature is 131, the temperature is 76° C., and/or the temperature is 168.8° F., the minimum pressure data is 4,023 psig. Although not shown in FIG. 8, the look-up table could also include the maximum pressure data in addition to the minimum pressure data.

Referring back to FIG. 2, Storage unit 36 is an EEPROM, but can be any other type of storage device such as a random-access memory, hard-disk drive, etc. Control unit 34 is a micro-controller, but can be any other type of processor.

Output driver 38 can then send either the first signal or the second signal to an external apparatus such as a light bulb on a cockpit of an airplane. If the light bulb receives the first signal such as an "off" signal, the light bulb will remain off indicating that there is no problem with the amount of material in the vessel. If the light bulb receives the second signal such as an "on" signal, the light bulb will be activated indicating that there is a problem with the amount of material in the vessel. Conversely, the light bulb could be activated when it receives the first signal and turn off when it receives the second signal.

In addition, storage unit 36 can also periodically store temperature data and a plurality of minimum rate of temperature change value corresponding to a situation, a plurality of substitute rate of temperature change values corresponding to the plurality of minimum rate of temperature change values, a plurality of maximum rate of temperature change values corresponding to the situation, and a plurality of substitute rate of temperature changes corresponding to the plurality of maximum rate of temperature change values. The situations can be, for example, when an airplane is taking off, landing, or other conditions which would likely result in a rapid increase or decrease in ambient temperature. Control unit 34 then monitors the stored temperature data and the temperature data from temperature sensor 28 to determine the rate of temperature change and compensate for a thermal lag condition.

A thermal lag condition can occur in a situation such as when an airplane is taking off from or landing onto a desert where there is a rapid change in temperature in the ambient air. The pressure vessel and its material display a specific thermal conductance with the application of a thermal source such as the ambient air. Usually the pressure vessel and its contents have a high heat capacity and a low conductivity (high resistivity) that translates into a high thermal mass. In the presence of a heat source, the higher thermal mass means that the vessel and its material will tend to heat up much slower than the surrounding ambient air. Conversely, in the presence of a cooling source, the higher thermal mass means that the vessel and the material will tend to cool down much slower than the ambient air.

For example, in as little as 20 minutes, the ambient temperature can decrease rapidly from 130° F. to −65° F. as the airplane takes off or increase rapidly from −65° F. to 130° F. as the airplane lands, respectively. In the situation where the airplane is landing onto the desert, temperature sensor 28 could detect a rate of temperature change value of 2.0° F./min. in the vessel due to the rapid increase in the ambient temperature. However, since temperature sensor 28 may not be directly on the material within the vessel itself, the material could actually have a rate of temperature change value of 1.0° F./min. Thus, there is a thermal lag condition where the material within the vessel absorbs energy at a much slower rate and consequently has a slower temperature increase than what control unit 34 detects based on the temperature data from temperature sensor 28.

Since control unit 34 utilizes the temperature data from temperature sensor 28 to determine whether to output the first signal indicating there is an acceptable amount of material within the vessel or the second signal indicating there is an unacceptable amount of material within the vessel, control unit 34 could output the wrong signal if the temperature data is incorrect. For example, if the temperature data is higher than the actual temperature of the material, the corresponding minimum pressure data to the temperature data would be higher than what the minimum pressure data should actually be based on the actual temperature of the material. Thus, control unit 34 may erroneously output the second signal indicating there is insufficient amount of material within the vessel.

To compensate for a thermal lag condition, control unit 34 substitutes the temperature data with a substitute temperature data. If the temperature change is below the minimum rate of temperature change value for the situation, control unit 34 substitutes the temperature data from temperature sensor 28 with a substitute temperature data based on one of the plurality of substitute rate of temperature change values corresponding to the minimum rate of temperature change value. Likewise, if the temperature change is above the maximum rate of temperature change value for a situation, control unit 34 substitutes the temperature data from temperature sensor 28 with a substitute temperature data based on one of the plurality of substitute rate of temperature change values corresponding to the maximum rate of temperature change value.

This substitution of the temperature data with the substitute temperature data could be done for a period of time or until a condition is reached such as when the substitute temperature data is equivalent to the temperature data, the rate of temperature change value is substantially equal to zero, the rate of temperature change value is above the minimum rate of temperature change value and below the maximum rate of temperature value, or the temperature data has substantially stabilized. Furthermore, the period of time could be the period of time until it is predicted that the condition will be reached.

In the above example where the airplane is landing onto the desert, the maximum rate of temperature change value for the situation could be equivalent or substantially equivalent to what the actual rate of temperature change value for the material within the vessel should be when the airplane is landing onto the desert. Thus, the maximum rate of temperature change value is 1.0° F./min. The substitute rate of temperature change value could be equivalent to the minimum rate of temperature change value 1.0° F./min, but it could also be some alternate value. Control unit 34 would then substitute a substitute temperature data based on the substitute rate of temperature value for the temperature data for the period of time or until the condition is reached.

Similarly if the airplane is taking off from the desert, temperature sensor 28 could detect a rate of temperature change value of −2.0° F./min. due to the ambient temperature. However, since temperature sensor 28 may not be directly on the material within the vessel itself, the material could actually have a rate of temperature change value of −1.0° F./min. The minimum rate of temperature change value is −1.0° F./min. The substitute rate of temperature change value could be equivalent to the minimum rate of temperature change value −1.0° F./min, but it could also be some alternate value. Control unit 34 would then substitute a substitute temperature data based on the substitute rate of temperature value for the temperature data for the period of time or until the condition is reached.

Furthermore, if power to the TCPS is shut-off, it is contemplated that control unit 34 could cease compensating for the thermal lag condition and stop substitution of the temperature data with a substitute temperature data. This is beneficial because it may be unknown if the rate of temperature change value would be accurate and thus the substitute temperature data may be inaccurate, too.

Thus, the compensation of the thermal lag condition by control unit 34 is beneficial because it allows the TCPS to be mounted away from the material of the vessel instead of directly on the material of the vessel or within the vessel itself.

Figure 9:
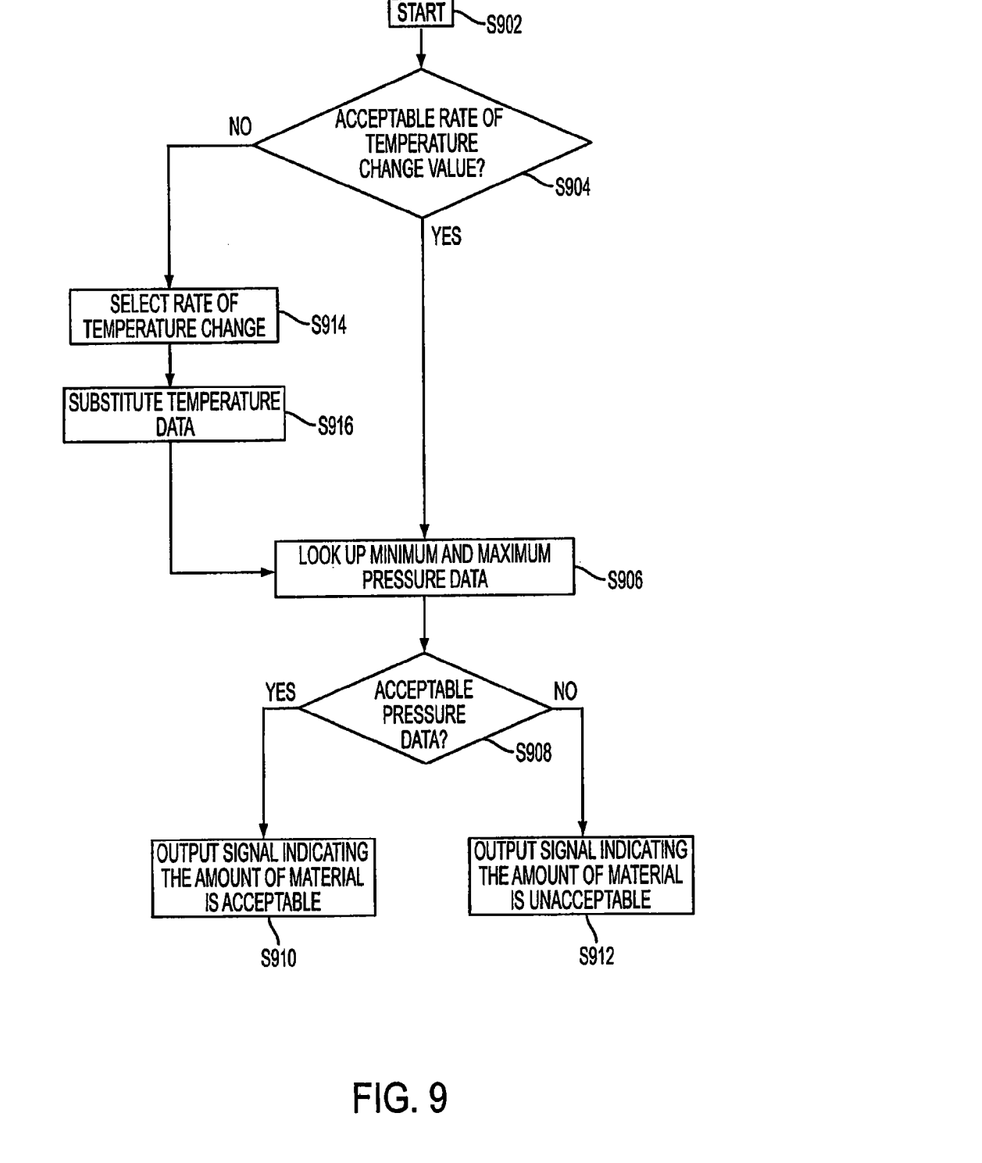
FIG. 9 is a flow chart for the control unit.

FIG. 9 depicts a flow-chart for control unit 34. Control unit 34 starts in Step S902 receiving pressure data from pressure sensor 22 and temperature data from temperature sensor 28. Control unit 34 determines whether there is an acceptable rate of temperature change value based on the temperature data from pressure sensor 28 and the temperature data stored in storage unit 36 in step S904. If the rate of temperature change value is unacceptable, control unit 34 proceeds to step S914. If, however, the rate of temperature change value is acceptable, control unit 34 proceeds to step S906. Control unit 34 selects the appropriate rate of temperature change value in step S914, substitutes the temperature data with a substitute temperature data for a period of time in step S916, and proceeds to step S906.

In step S906, control unit 34 looks up the minimum and maximum pressure data corresponding to the temperature data from the look-up table in storage unit 36. In step S908, control unit 34 determines if there is an acceptable pressure data. If the pressure data from the pressure sensor is above the minimum pressure data and below the maximum pressure data, control unit 34 outputs a first signal indicating that the amount of material in the vessel is acceptable in Step S910. If, however, the pressure data from the pressure sensor is below the minimum pressure data or above the maximum pressure data, control unit 34 outputs a second signal indicating that the amount material in the vessel is unacceptable in step S912.

Referring back to FIG. 2, the TCPS also has an optional test module 24 connected between pressure sensor 22 and amplifier 26. In the present invention test module 24 is a press to test switch but could be a variety of other modules or devices. While test module 24 is depressed or activated, test module 24 outputs a test pressure data substituted for the pressure data to amplifier 26, analog to digital converter 32 and control unit 34. Test pressure data indicates a pressure below the minimum pressure data or above the maximum pressure data. Thus control module 34 will output a second signal indicating there is an unacceptable amount of material within the vessel. However, when test module 24 is released or inactivated, test module 24 ceases outputting the test pressure data and normal transmission of pressure data to amplifier 26, analog to digital converter 32 and control unit 34 resumes. If control unit 34 does not output the second signal when it is depressed or activated, there could be problems with the TCPS. Therefore, test module 24 allows a user to test to see if TCPS 20 is functional and if it will accurately determine when there is an unacceptable amount of material within the vessel.

In the TCPS, optional voltage regulator 30 supplies power to pressure sensor 22, temperature sensor 28, analog to digital converter 32, control unit 34, and storage unit 30. Voltage regulator 30 receives power from an external source such as an aircraft power supply with a first voltage and converts it to a second voltage. For example voltage regulator 30 could receive a power supply of 16 to 32 volts DC from the aircraft power supply and convert it to a 5 volt DC power supply for pressure sensor 22, temperature sensor 28, analog to digital converter 32, control unit 34, and storage unit 30.

Optional electro-magnetic interference protection unit 40 is connected to output driver 38 and voltage regulator 30. Electro-magnetic interference protection unit can reduce the electro-magnetic interference received by voltage regulator 30 and/or output driver 38.

Figure 3:
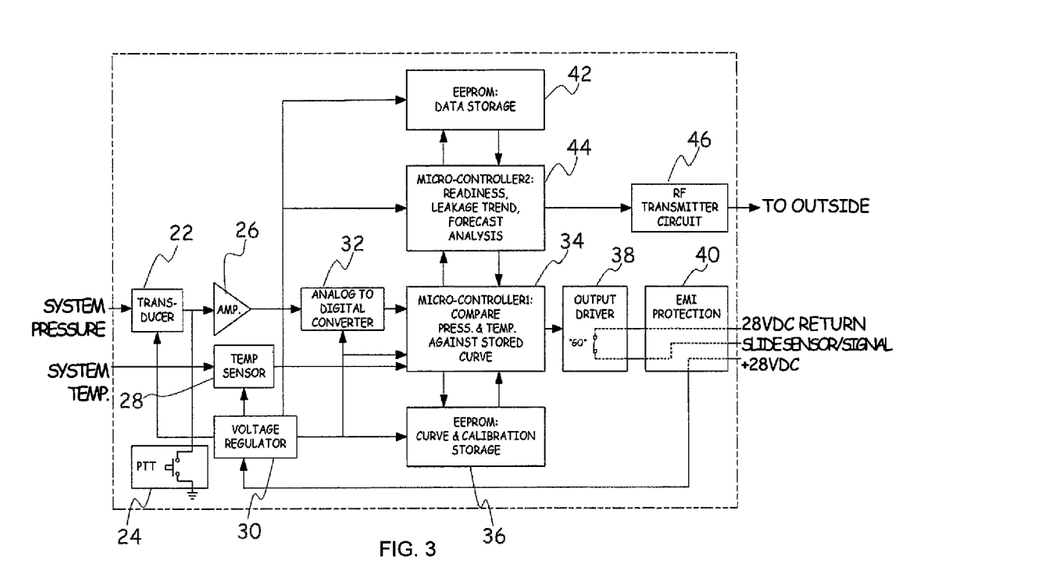
FIG. 3 is a block diagram of an alternative embodiment of the present invention.

FIG. 3 depicts another embodiment of the present invention. In this embodiment, the TCPS includes the components from FIG. 2 and further includes a second control unit 44, a second storage unit 42, and a wireless transmission unit 46. Second control unit 44 is a micro-controller, but can be any other type of processor. Storage unit 34 is an EEPROM, but can be any other type of storage device such as a random-access memory, hard-disk drive, etc. Wireless transmission unit 46 is an RF transmitter but can be any other type of transmission unit such as, a Bluetooth transmission unit, wireless internet transmission unit, or any other type of transmission unit.

Second control unit 44 receives the temperature data and the pressure data from first control unit 34 and stores the temperature data and the pressure data in second storage unit 42 at periodic intervals. Second control unit 44 can monitor and analyze the temperature and the pressure data to determine if there is a leakage in the vessel. Furthermore, when there is a leakage in the vessel, second control unit 44 can determine and forecast when the vessel needs to be serviced. For example, if the vessel would have an acceptable amount of material for a period of time despite the leakage in the vessel, second control unit 44 can calculate the period of time and appropriately indicate that maintenance should be performed on the vessel before the expiration of the period of time. Thus, if a leak is discovered in the vessel while the airplane is on the ground and the vessel will still have an acceptable level of material during the duration of the first flight but before the second flight, second control unit 44 can indicate that the vessel should be serviced after the first flight but before the second flight. This allows the airplane to continue on schedule with the first flight and be maintained during the delay between the first flight and the second flight. Otherwise, in conventional systems, the airplane might have to be serviced immediately before the first flight, especially if the leakage in the vessel is discovered immediately prior to a departure time of the first flight. This could delay the first flight and be inconvenient for the passengers of the airplane.

Second control unit 44 is connected to an external apparatus through wireless transmission unit 46 to transmit the temperature data, the pressure data, whether there is a leakage in the vessel to an external apparatus, and when the vessel should be serviced. The external apparatus could be, for example, a handheld device, a remotely located computer, or any other type of electronic device capable of receiving pressure data and temperature data.

It is also contemplated that second control unit 44 and its functions could be incorporated into first control unit 34. Furthermore, it is also contemplated that second storage unit 42 could be incorporated into first storage unit 34.

Figure 4:
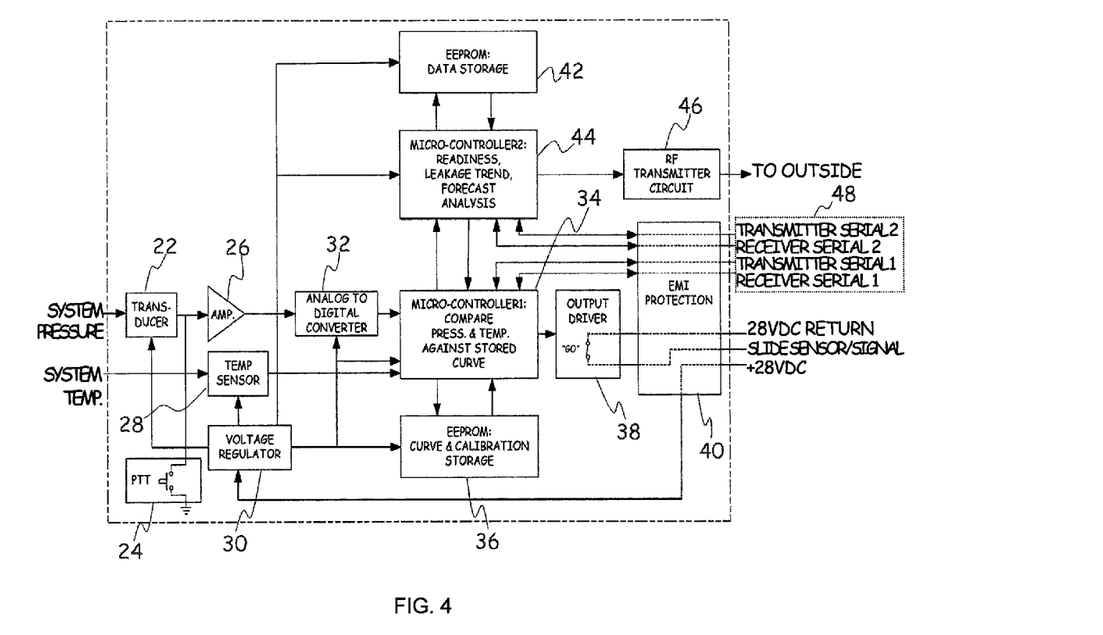
FIG. 4 is a block diagram of another alternative embodiment of the present invention.

FIG. 4 depicts yet another embodiment of the present invention. In this embodiment, the TCPS includes the components from FIG. 3 and further includes a connection unit 48 connected to control unit 34 and second control unit 44. Connection unit 48 is a serial port in the present invention but could be any other type of connection including a USB, a wireless connection port. Connection unit 48 allows second control unit 34 and control unit 44 to be updated, configured, and/or calibrated. For example new algorithms and programs could be implemented in second control unit 44 to allow better detection of leakage in the vessel. Furthermore, connection unit 48 could also allow storage unit 36 and second storage unit 42 to be updated, configured, and/or calibrated. For example, the look-up table in storage unit 36 could be updated or supplemented. Thus, connection unit 48 allows control unit 34, second control unit 44, storage unit 36, and second storage unit 42 to be reconfigured thus extending their shelf life when new technology becomes available.

Figure 5:
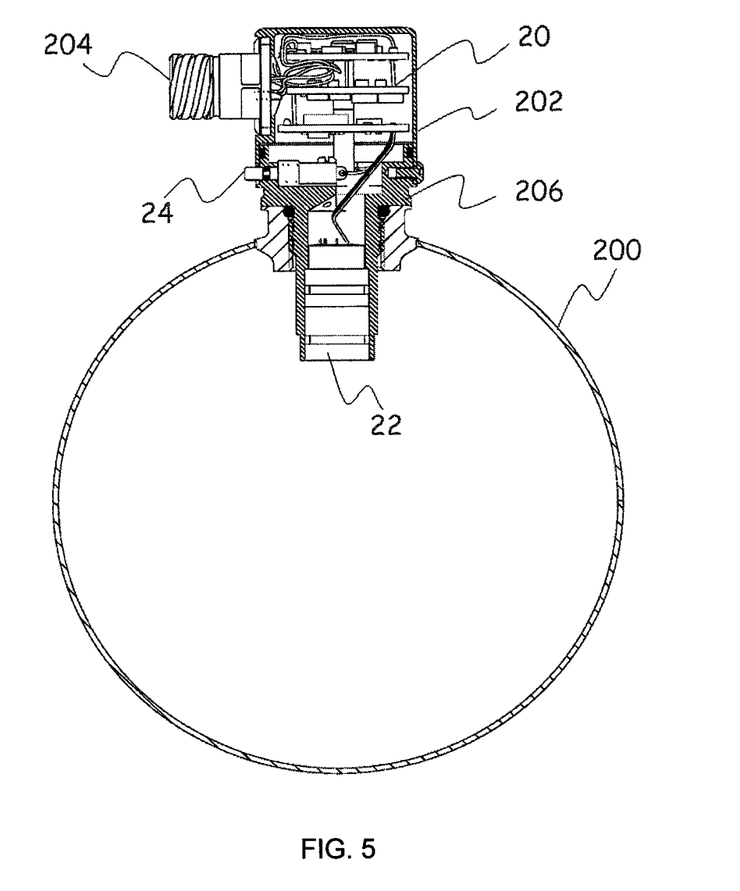
FIG. 5 is a cross-sectional view of an embodiment of the present invention as a system.

FIG. 5 is a cross-sectional view of an embodiment of the present invention as a system. In FIG. 5, the TCPS assembly includes electronic components 20, an external housing 202, and an external connection 204. Electronic components 20 are housed in external housing 202. In the present embodiment, pressure sensor 22 and test module 24 are located away from the remaining portions of electronic components 20. Pressure sensor 22 is attached to a lower body 206 of external housing 202. Lower body 206 is also the mounting surface for electronic components 20. Test module 24 is mounted to lower body 206 and protrudes from the surface of housing 202 for external access. External electrical connection 204 is mounted to an exterior of housing 202 is also mounted to an exterior of housing 202 to provide electrical access to electronic components 20. The entire TCPS assembly is mounted onto vessel 200. Vessel 200 could be a fire extinguisher, a slide raft system, or any other container capable of containing material. The material could be a fire extinguishing agent such as Halon 1301 or other types of fillant such as liquid or gaseous material.

Figure 6:
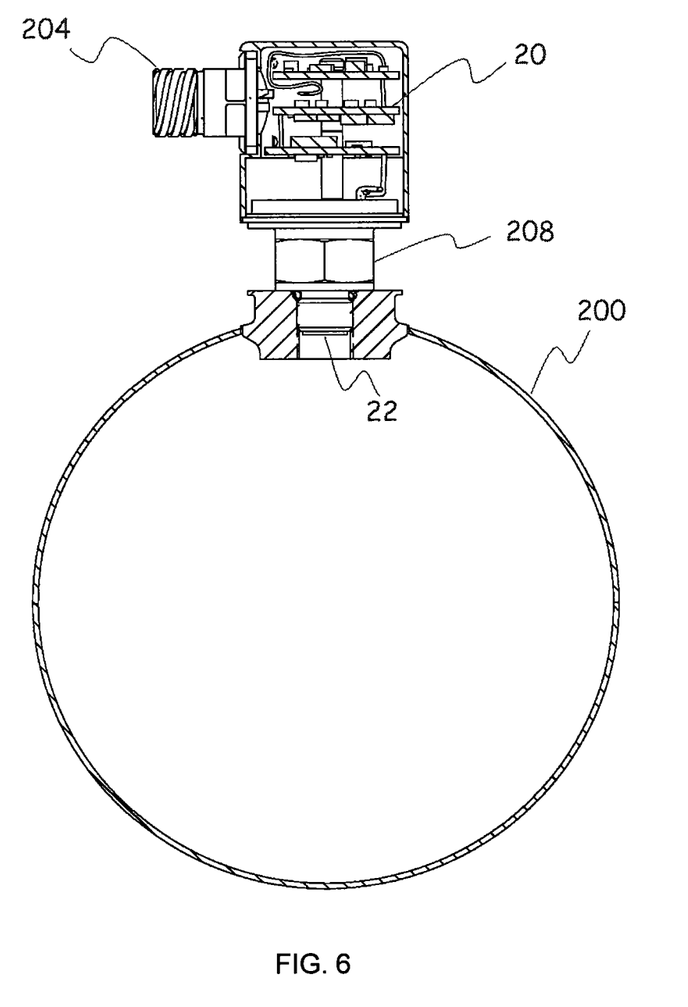
FIG. 6 is a cross-sectional view of an alternative embodiment of the present invention as a system.

FIG. 6 is a cross-sectional view of an alternate embodiment of the present invention as a system. In FIG. 6, lower body 206 is a special lower body 208 with hex flats for use with a torque wrench.

Figure 7:
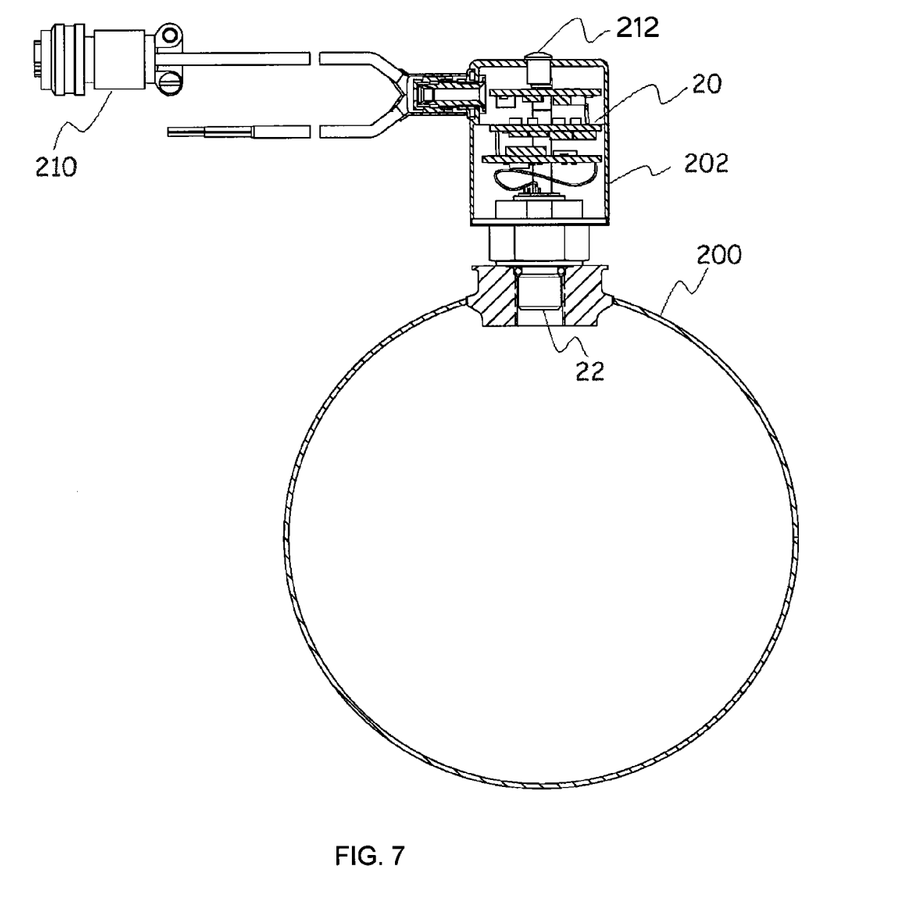
FIG. 7 is a cross-sectional view of another alternative embodiment of the present invention as a system.

FIG. 7 is a cross-sectional view of an alternate embodiment of the present invention as a system. In FIG. 7, external connector 210 extends beyond the surface of external housing 202. External connector 210 could be, for example, a pig tail connector. Furthermore, this embodiment optionally includes an externally visible light-emitting diode ("LED") 212 that can illuminate a green or red indicator depending on whether the amount of material within vessel 200 is acceptable or unacceptable. It is contemplated that a green indicator could indicate that the amount of material within vessel 200 is acceptable and a red indicator could indicate that the amount of material within vessel 200 is unacceptable. It is also comtemplated that other colors aside from red or green could be used.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A temperature compensated pressure switch for determining and analyzing an amount of material within a vessel comprising:
   a first control unit;
   a pressure sensor connected to the first control unit outputting a first pressure data;
   a temperature sensor connected to the first control unit outputting a first temperature data; and
   a first storage unit connected to the first control unit storing minimum pressure data corresponding to temperature data, the first temperature data at periodic intervals, maximum rate of temperature change values, first substitute rate of temperature change values corresponding to maximum rate of temperature change values, minimum rates of temperature change values, and second substitute rate of temperature change values corresponding to minimum rates of temperature change values,
   wherein when the first control unit determines, based on the first temperature data stored in the first storage unit, that a rate of temperature change value is above a maximum rate of temperature change value, the first control unit substitutes a second temperature data, based on a first substitute rate of temperature change value, for the first temperature data for a period of time, and when the first control unit determines, based on the first temperature data stored in the first storage unit, that a rate of temperature change value is below a minimum rate of temperature change value, the first control unit substitutes a different second temperature data, based on a second substitute rate of temperature change value, for the first temperature data for a period of time, and
   wherein the first control unit outputs a first signal indicating the amount of material is acceptable when the first pressure data is above the minimum pressure data and outputs a second signal indicating the amount of material is unacceptable when the first pressure data is not above the minimum pressure data.

2. The temperature compensated pressure switch of claim 1 wherein the first storage unit further stores maximum pressure data corresponding to temperature data, and the first control unit outputs the first signal indicating the amount of material is acceptable when the first pressure data is below the maximum pressure data and the second signal indicating the amount of material is unacceptable when the first pressure data is not below the maximum pressure data.

3. The temperature compensated pressure switch of claim 2 further comprising a wireless transmission unit connected to the first control unit allowing the first control unit to communicate with an external apparatus.

4. The temperature compensated pressure switch of claim 2 wherein the first control unit stores the first pressure data and the first temperature data in the first storage unit at periods of time and the second control unit determines whether there is a leak in the vessel by comparing the first pressure data and the first temperature data with the first pressure data and the first temperature data stored in the first storage unit, and when the second control unit determines there is a leak in the vessel, the first control unit determines when the vessel will need to be serviced based on the first pressure data, the first temperature data, the first pressure data stored in the first storage unit, and the first temperature data stored in the first storage unit.

5. The temperature compensated pressure switch of claim 2 wherein the first storage unit is an EEPROM.

6. The temperature compensated pressure switch of claim 2 further comprising:
   an amplifier connected to the pressure sensor; and
   an analog to digital converter connected to the amplifier and the first control unit.

7. The temperature compensated pressure switch of claim 2 further comprising a voltage regulator connected to the temperature sensor, the pressure sensor, and the storage unit.

8. The temperature compensated pressure switch of claim 7 further comprising a test module connected to the first control unit and the pressure sensor, wherein when the test module is activated, the first control unit receives a third pressure data substituted for the first temperature data, the third pressure data indicating a pressure below the minimum pressure data or above the maximum pressure data.

9. The temperature compensated pressure switch of claim 8 further comprising:
   an output driver connected to the first control unit receiving the first signal or the second signal output by the first control unit and transmitting the first signal or the second signal to an external apparatus; and
   an electro-magnetic interference protection unit connected to the output driver and the voltage regulator.

10. The temperature compensated pressure switch of claim 9 further comprising:
    a second control unit connected to the first control unit; and
    a second storage unit connected to the second control unit,
    wherein the second control unit stores the first pressure data and the first temperature data in the second storage unit at periods of time, and
    wherein the second control unit determines whether there is a leak in the vessel by comparing the first pressure data and the first temperature data with the first pressure data and the first temperature data stored in the second storage unit.

11. The temperature compensated pressure switch of claim 10 wherein when the second control unit determines there is a leak in the vessel, the second control unit determines when the vessel will need to be serviced based on the first pressure data, the first temperature data, the first pressure data stored in the second storage unit, and the first temperature data stored in the second storage unit.

12. The temperature compensated pressure switch of claim 11 further comprising a wireless transmission unit connected to the second control unit allowing the second control unit to communicate with an external apparatus.

13. The temperature compensated pressure switch of claim 12 wherein the first control unit includes a first communication port allowing the first control unit and the first storage unit to be configured, and the second control unit includes a second communication port allowing the second control unit and the second storage unit to be configured.

14. A temperature compensated pressure switch for determining and analyzing an amount of material within a vessel comprising:
    a first control unit;
    a wireless transmission unit connected to the first control unit;
    a pressure sensor connected to the first control unit outputting a first pressure data;
    a temperature sensor connected to the first control unit outputting a first temperature data;
    a first storage unit connected to the first control unit storing minimum pressure data and maximum pressure data corresponding to temperature data, the first temperature data at periodic intervals, maximum rate of temperature change values, first substitute rate of temperature change values corresponding to maximum rate of temperature change values, minimum rates of temperature change values, and second substitute rate of temperature change values corresponding to minimum rates of temperature change values, wherein when the first control unit determines, based on the first temperature data stored in the first storage unit, that a rate of temperature change value is above a maximum rate of temperature change value, the first control unit substitutes a second temperature data, based on a first substitute rate of temperature change value, for the first temperature data for a period of time, and when the first control unit determines, based on the first temperature data stored in the first storage unit, that a rate of temperature change value is below a minimum rate of temperature change value, the first control unit substitutes a different second temperature data, based on a second substitute rate of temperature change value, for the first temperature data for a period of time, and wherein the first control unit outputs a first signal indicating the amount of material is acceptable when the first pressure data is above the minimum pressure data and below the maximum pressure data and outputs a second signal indicating the amount of material is unacceptable when the first pressure data is not above the minimum pressure data and not below the maximum pressure data.

15. The temperature compensated pressure switch of claim 14 wherein the first control unit stores the first pressure data and the first temperature data in the first storage unit at periods of time and the first control unit determines whether there is a leak in the vessel, and when there is a leak in the vessel, the first control unit determines when the vessel will need to be serviced by comparing the first pressure data and the first temperature data with the first pressure data and the first temperature data stored in the first storage unit.

16. The temperature compensated pressure switch of claim 14 further comprising:
an amplifier connected to the pressure sensor; and
an analog to digital converter connected to the amplifier and the first control unit.

17. The temperature compensated pressure switch of claim 14 further comprising:
a second control unit connected between the first control unit and the wireless transmission unit; and
a second storage unit connected to the second control unit, wherein the second control unit stores the first pressure data and the first temperature data in the second storage unit at periods of time, and the second control unit determines whether there is a leak in the vessel, and when there is a leak in the vessel, the second control unit determines when the vessel will need to be serviced by comparing the first pressure data and the first temperature data with the first pressure data and the first temperature data stored in the second storage unit.

18. The temperature compensated pressure switch of claim 17 wherein the first control unit includes a first communication port allowing the first control unit and the first storage unit to be configured, and the second control unit includes a second communication port allowing the second control unit and the second storage unit to be configured.

19. The temperature compensated pressure switch of claim 14 further comprising a test module connected to the first control unit and the pressure sensor, wherein when the test module is activated, the first control unit receives a third pressure data substituted for the first temperature data, the third pressure data indicating a pressure below the minimum pressure data or above the maximum pressure data.

20. The temperature compensated pressure switch of claim 19 further comprising an output driver connected to the first control unit receiving the first signal or the second signal output by the first control unit and transmitting the first signal or the second signal to an external apparatus.

21. The temperature compensated pressure switch of claim 20 further comprising:
a voltage regulator connected to the temperature sensor, the pressure sensor, and the storage unit; and
an electro-magnetic interference protection unit connected to the output driver and the voltage regulator.

22. A system for storing and monitoring an amount of material comprising:
a vessel for storing the material; and
a temperature compensated pressure switch mounted on the vessel comprising:
a first control unit;
a pressure sensor connected to the first control unit outputting pressure data;
a temperature sensor connected to the first control unit outputting a first temperature data; and
a first storage unit connected to the first control unit storing minimum pressure data corresponding to temperature data, the first temperature data at periodic intervals, maximum rate of temperature change values, first substitute rate of temperature change values corresponding to maximum rate of temperature change values, minimum rates of temperature change values, and second substitute rate of temperature change values corresponding to minimum rates of temperature change values, wherein when the first control unit determines, based on the first temperature data stored in the first storage unit, that a rate of temperature change value is above a maximum rate of temperature change value, the first control unit substitutes a second temperature data, based on a first substitute rate of temperature change value, for the first temperature data for a period of time, and when the first control unit determines, based on the first temperature data stored in the first storage unit, that a rate of temperature change value is below a minimum rate of temperature change value, the first control unit substitutes a different second temperature data, based on a second substitute rate of temperature change value, for the first temperature data for a period of time, and wherein the first control unit outputs a first signal indicating the amount of material is acceptable when the pressure data is above the minimum pressure data and outputs a second signal indicating the amount of material is unacceptable when the pressure data is not above the minimum pressure data.

23. The system of claim 22 wherein the first storage unit further comprises a wireless transmission unit connected to the first control unit allowing the first control unit to communicate with an external apparatus.

24. The system of claim 22 wherein the first storage unit further stores maximum pressure data corresponding to temperature data and the first control unit outputs a first signal when the pressure data is below the maximum pressure data and outputs a second signal when the pressure data is not below the maximum pressure data.

25. The system of claim 24 wherein the temperature compensated pressure switch further comprises:
a second control unit connected to the first control unit;
a second storage unit connected to the second control unit; and
a wireless transmission unit connected to the second control unit allowing the second control unit to communicate with an external apparatus.

* * * * *